(12) United States Patent
Barnea et al.

(10) Patent No.: US 12,379,275 B1
(45) Date of Patent: Aug. 5, 2025

(54) TOUCHPAD FORCE DETERMINATIONS

(71) Applicant: Microsoft Technology Licensing, LLC, Redmond, WA (US)

(72) Inventors: Shiran Barnea, Herzliya (IL); Ahia Peretz, Elkana (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/434,627

(22) Filed: Feb. 6, 2024

(51) Int. Cl.
*G01L 25/00* (2006.01)
*G01L 1/14* (2006.01)
*G06F 3/0354* (2013.01)
*G06F 3/041* (2006.01)
*G06F 3/044* (2006.01)

(52) U.S. Cl.
CPC .............. *G01L 25/00* (2013.01); *G01L 1/146* (2013.01); *G06F 3/03547* (2013.01); *G06F 3/044* (2013.01); *G06F 3/041* (2013.01); *G06F 3/04142* (2019.05); *G06F 3/04144* (2019.05); *G06F 2203/04104* (2013.01); *G06F 2203/04105* (2013.01)

(58) Field of Classification Search
CPC ..... G01L 1/146; G01L 25/00; G06F 3/03547; G06F 3/041; G06F 3/04142; G06F 3/04144; G06F 3/044; G06F 2203/04104; G06F 2203/04105

See application file for complete search history.

(56) References Cited

U.S. PATENT DOCUMENTS

| | | |
|---|---|---|
| 2010/0265208 A1 | 10/2010 | Kim |
| 2012/0327025 A1 | 12/2012 | Huska |
| 2019/0064984 A1* | 2/2019 | Schwartz ............ G06F 3/04883 |
| 2019/0187854 A1 | 6/2019 | Hosur |
| 2020/0064952 A1 | 2/2020 | Gupta |
| 2020/0341584 A1 | 10/2020 | Wang |
| 2021/0294479 A1* | 9/2021 | Moscovich ............ G06F 3/045 |
| 2022/0083141 A1 | 3/2022 | Mukherjee |
| 2022/0164102 A1* | 5/2022 | Rosenberg ............ G06F 3/0445 |

FOREIGN PATENT DOCUMENTS

EP 2320309 A1 7/2018

* cited by examiner

*Primary Examiner* — Mihir K Rayan
(74) *Attorney, Agent, or Firm* — Alleman Hall & Tuttle LLP

(57) ABSTRACT

Touchpads, computing devices, and methods for estimating a plurality of forces exerted by a plurality of contacts on a touchpad are disclosed. In one example, a method comprises estimating a plurality of forces exerted by a plurality of contacts at a plurality of touch locations on a touchpad. For each contact, a plurality of assigned calibration weights are determined from a predetermined set of calibration weights. The plurality of assigned calibration weights and data from touchpad force sensors are used to determine a force exerted by the contact on the touchpad.

17 Claims, 10 Drawing Sheets

|  | 1 | 2 | 3 | 4 | 5 | 6 |
|---|---|---|---|---|---|---|
| 1 | 113 | 11 | 3 | 3 | 2 | 30 |
| 2 | 32 | 73 | 19 | 5 | 23 | 9 |
| 3 | 4 | 8 | 116 | 29 | 2 | 3 |
| 4 | 4 | 3 | 43 | 93 | 13 | 2 |
| 5 | 11 | 20 | 8 | 18 | 74 | 26 |
| 6 | 40 | 3 | 3 | 2 | 12 | 101 |
| 7 | 2 | 14 | 192 | 143 | 17 | 2 |
| 8 | 40 | 67 | 41 | 31 | 76 | 34 |
| 9 | 176 | 20 | 1 | 1 | 21 | 144 |

Rows: Calibration Position; Columns: Sensors

FIG. 6

|  | 1 | 2 | 3 | 4 | 5 | 6 |
|---|---|---|---|---|---|---|
| 1 | 0.8 | 0.1 | 0 | 0 | 0 | 0.2 |
| 2 | 0.2 | 0.5 | 0.1 | 0 | 0.2 | 0.1 |
| 3 | 0 | 0.1 | 0.8 | 0.2 | 0 | 0 |
| 4 | 0 | 0 | 0.3 | 0.6 | 0.1 | 0 |
| 5 | 0.1 | 0.1 | 0.1 | 0.1 | 0.5 | 0.2 |
| 6 | 0.3 | 0 | 0 | 0 | 0.1 | 0.7 |
| 7 | 0 | 0.1 | 1.3 | 1 | 0.1 | 0 |
| 8 | 0.3 | 0.4 | 0.3 | 0.2 | 0.5 | 0.2 |
| 9 | 1.2 | 0.1 | 0 | 0 | 0.1 | 1 |

Rows: Calibration Position; Columns: Sensors

FIG. 7

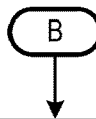

For each contact of the plurality of contacts, using the plurality of assigned calibration weights and data from the force sensors to determine a force exerted by the contact on the touchpad 236

Wherein using the plurality of assigned calibration weights and the data from the force sensors to determine the force exerted by each contact of the plurality of contacts on the touchpad comprises, for a first contact of the plurality of contacts:

Determining a force-per-sensor at each force sensor of the plurality of force sensors, wherein the force-per-sensor is attributable only to the first contact 240

Summing the determined forces-per-sensor to determine a total force exerted by the first contact on the touchpad 244

Wherein determining the force-per-sensor at each force sensor of the plurality of force sensors for the first contact comprises, for a first force sensor of the plurality of force sensors, dividing the assigned calibration weight that is associated with the first force sensor and the first contact by a sum of the assigned calibration weight that is associated with the first force sensor and the first contact and one or more additional assigned calibration weights associated with the first force sensor and with one or more additional contacts of the plurality of contacts 248

For each contact of the plurality of contacts:

Using the determined force exerted by the contact on the touchpad and the plurality of assigned calibration weights to generate a plurality of force-adjusted assigned calibration weights 252

Using the plurality of force-adjusted assigned calibration weight and the data from the force sensors to generate a force-adjusted force exerted by the contact on the touchpad 256

Wherein the plurality of force sensors are capacitive force sensors 260

FIG. 11B

TOUCHPAD FORCE DETERMINATIONS

BACKGROUND

Some computing devices include a force sensing touchpad for receiving user inputs. In some use cases the touchpad receives multiple contacts at different locations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to touchpads, computing devices, and related methods for estimating forces exerted by multiple contacts at multiple touch locations on a touchpad. In some examples at a computing device, a method is disclosed for estimating a plurality of forces exerted by a plurality of contacts at a plurality of touch locations on a touchpad. The method comprises, for each contact of the plurality of contacts, determining a plurality of assigned calibration weights from a predetermined set of calibration weights. And for each contact of the plurality of contacts, the plurality of assigned calibration weights and data from touchpad force sensors are used to determine a force exerted by the contact on the touchpad.

BRIEF DESCRIPTION OF THE DRAWINGS

FIG. 6 shows a table of forces corresponding to the calibration weight contacting the trackpad at different calibration positions according to an example of the present disclosure.

FIG. 7 shows the table of FIG. 6 with normalized values according to an example of the present disclosure.

FIGS. 11A-11B are a flow chart of a method for estimating a finger force exerted by a finger on a touchpad according to examples of the present disclosure.

DETAILED DESCRIPTION

Figure 1:
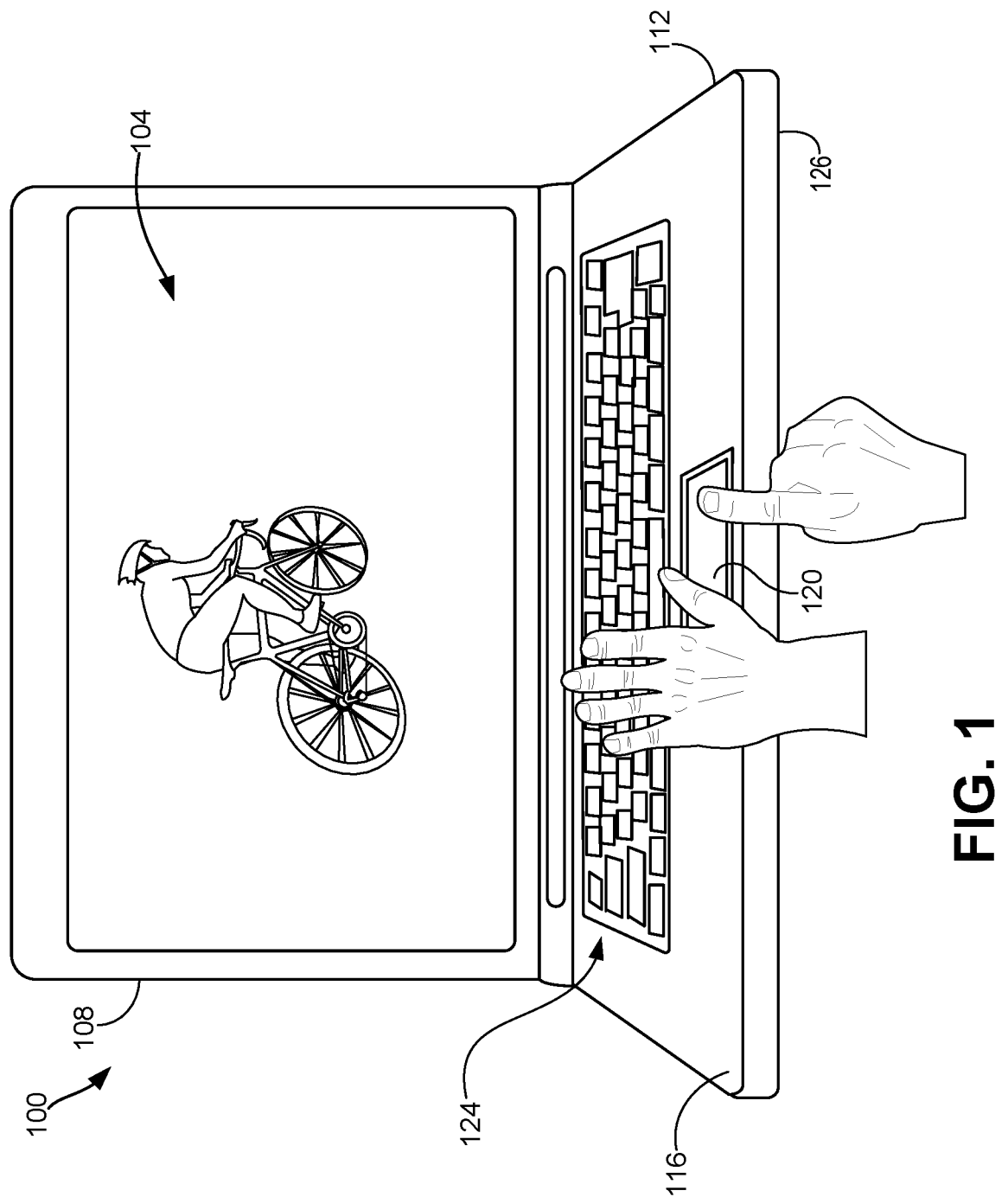
FIG. 1 shows one example of a computing device utilizing a touchpad according to examples of the present disclosure.

Some computing devices include a touchpad for receiving user inputs. Force sensing touchpads can determine various magnitudes of force being applied to their surfaces. The different levels of force can be utilized to provide different forms of user input and user interface features. For example, when the force exerted on the touchpad by a finger force exceeds a threshold finger touch force, a click event can be reported to the computing device. In different examples the click event can be a selection of a displayed item or other user input. In some examples, when the finger force exceeds the threshold finger touch force, a haptic feedback component in the touchpad is actuated to produce haptic feedback, such as a mechanical click. For example, in some devices one or more conductive coils, linear resonant actuators (LRAs), or other haptic components are coupled to the touchpad and configured to vibrate the trackpad to provide haptic feedback to a user.

In some of these devices, the touchpad utilizes capacitance measurements to estimate a force applied to the touchpad. For example, in some devices a printed circuit board (PCB) is affixed to a cover glass assembly and resiliently supported over a base plate connected to electrical ground. In some examples, the PCB can be resiliently supported by one or more springs for relative movement toward and away from the base plate. One or more sensing pads (electrodes) are located between the PCB and the base plate. In such implementations, the capacitance between the sensing pads and the grounded base plate is a function of the distance between the sensing pads and the base plate.

In these examples, a capacitive force transducer can utilize displacement as a proxy for force. When a force applied to the cover glass assembly compresses the spring and reduces the distance between the sensing pads and the base plate, the capacitance changes. In this model, the capacitance is proportional to the applied force.

In one example, where the area of an electrode is represented by $A_{pad}$, the initial distance between the electrode and the base plate is $d_0$, and the change in the distance as a result of a force F applied by a user is d (F)=F/K, the capacitance as a result of the Force F is given by the following equation 1.1:

$$\text{Capacitance (Force)} = \varepsilon \frac{A_{pad}}{d_0 - d(F)} = \varepsilon \frac{A_{pad}}{d_0 - \frac{F}{K}} \quad \text{Equation 1.1}$$

where K is the spring constant of the spring between the PCB and the base plate, F is the force applied by the user on the touchpad, and & is the permittivity of the medium in the gap between the electrode and the base plate. In this manner, a measured change in capacitance can be used to calculate the magnitude of the applied force F.

In some examples, users can intentionally or unintentionally contact the touchpad with two or more fingers, portions of a hand or limb, or other contact surfaces. In these examples, accurately determining the force applied by each separate contact can be challenging.

Accordingly, configurations of the present disclosure provide touchpad configurations and related methods that address one or more drawbacks of prior systems. In different examples and as described in more detail below, configurations of the present disclosure can accurately estimate forces exerted on a touchpad by multiple contacts that are contacting the touchpad simultaneously. For each contact of a plurality of contacts, using a predetermined set of calibration weights, a plurality of assigned calibration weights are assigned to each contact. For each of the contacts, the plurality of assigned calibration weights and data from force sensors are used to determine the force exerted by the contact on the touchpad.

In one potential advantage of the present disclosure, these configurations can accurately estimate forces exerted on a touchpad by multiple contacts regardless of the contacts' classification (finger, palm, thumb, etc.) and/or the number of contacts. Additionally, by determining the separate forces exerted by each contact of multiple contacts on the touchpad, a force threshold applied to one contact (such as the active finger contacting the touchpad) can be utilized to enhance the user experience and more closely align to user intents in a variety of use cases. For example, in gaming applications, the ability to sense the separate forces applied by different fingers can provide more nuanced controls and immersive gameplay. Additionally, in accessibility applications, the ability to accurately determine the force of one contact among a plurality of contacts can enable limb-different users to interact with the touchpad more effectively.

Additionally and as described in more detail below, some examples of the present disclosure use the determined force exerted by a contact on the touchpad along with the plurality of assigned calibration weights for that contact to generate a force-adjusted assigned calibration weight. In these examples and in another potential advantage of the present disclosure, the force-adjusted calibration weight is then multiplied by the determined force to generate a force-adjusted force exerted by the contact on the touchpad, thereby increasing the accuracy of the estimated force exerted on the touchpad.

With reference now to FIGS. 1-10 and 12, an example computing device 100 is illustrated in the form of a laptop computer that includes a force sensing touchpad 120 for estimating a plurality of forces exerted by a plurality of contacts at various touch locations on the touchpad according to aspects of the present disclosure. In other examples, force sensing touchpads of the present disclosure can be implemented in tablet computing devices, foldable computing devices including multiple touch screens, wearable and other mobile computing devices, and any other type of computing device that utilizes a touchpad. In some examples, force sensing touchpads of the present disclosure can be implemented in keyboards or other user interface components that are separate from, or detachable from, a computing device.

In this example computing device 100 includes a touch screen display 104 on a display substrate 108 that is rotatably coupled to a chassis 112. The chassis 112 includes a user interaction surface 116 that comprises a force sensing touchpad 120 and keyboard 124, and an opposing rear cover 126. In some examples, chassis 112 and keyboard 124 are detachable from display substrate 108 to enable the user to use the keyboard in various positions separated from the touch screen display 104.

Touchpad 120 is configured to detect touch inputs from a user, including the position and force of a user's finger(s), thumb, palm, and/or other user body parts. In some examples the touchpad 120 is a mutual capacitance touchpad. In these examples, touch inputs are identified by sampling capacitance between a driving electrode and a sensing electrode. Driving electrodes are arranged in an array within the touchpad 120. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, touchpads employing other touch detection technologies, including but not limited to self-capacitance and projected capacitance touch detection, can be utilized.

Figure 2:
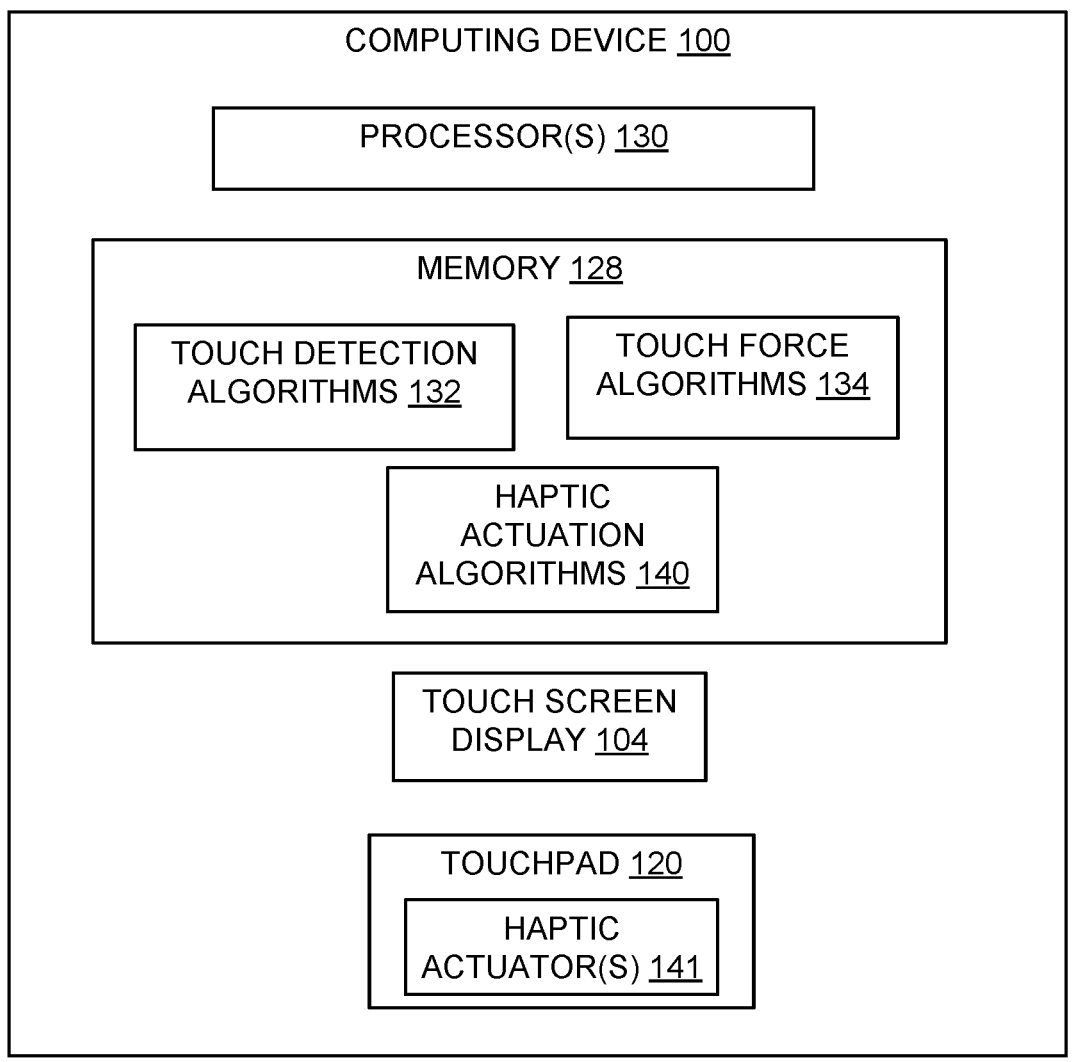
FIG. 2 shows a schematic view of selected components of the computing device of FIG. 1 according to examples of the present disclosure.

With reference now to FIG. 2, a schematic view of selected components of the example computing device 100 of FIG. 1 is provided. Computing device 100 includes memory 128 that stores instructions executable by a processor 130. For example, the memory 128 stores instructions in the form of touch detection algorithms 132 executable by the processor 130 to perform touch detection on the touchpad 120 using signals received from the touchpad. In some examples, touch detection algorithms 132 can determine the two-dimensional (x,y) location of multiple simultaneous contacts on the touchpad 120. In this example, memory 128 also stores instructions in the form of haptic actuation algorithms 140 that selectively control one or more haptic actuator(s) 141 in the touchpad 120 to generate haptic output via the touchpad 120. In other examples, touchpads of the present disclosure do not include haptic actuators or corresponding haptic actuation algorithms.

As described in more detail below, memory 128 also stores instructions in the form of touch force algorithms 134 executable by the processor 130 to estimate a plurality of forces exerted by a plurality of contacts at a plurality of touch locations on the touchpad 120. Additional details regarding memory 128, processor 130, and other components and subsystems of computing device 100 are described further below with reference to FIG. 12.

Figure 3:
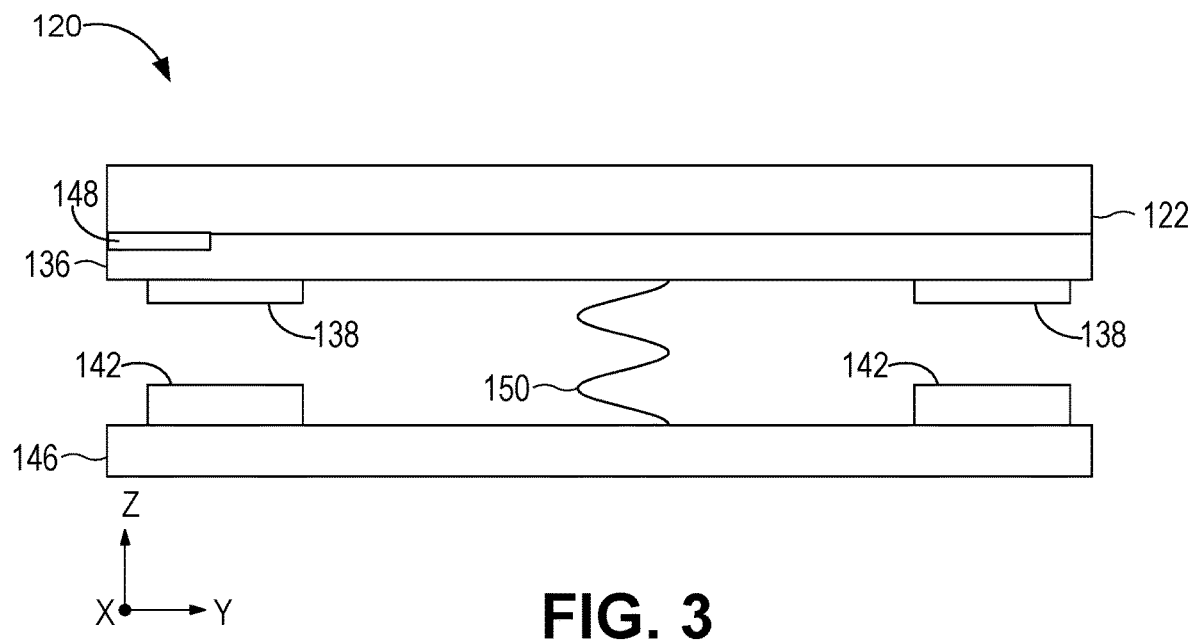
FIG. 3 shows a partial schematic cross section of the touchpad of FIG. 1.
Figure 4:
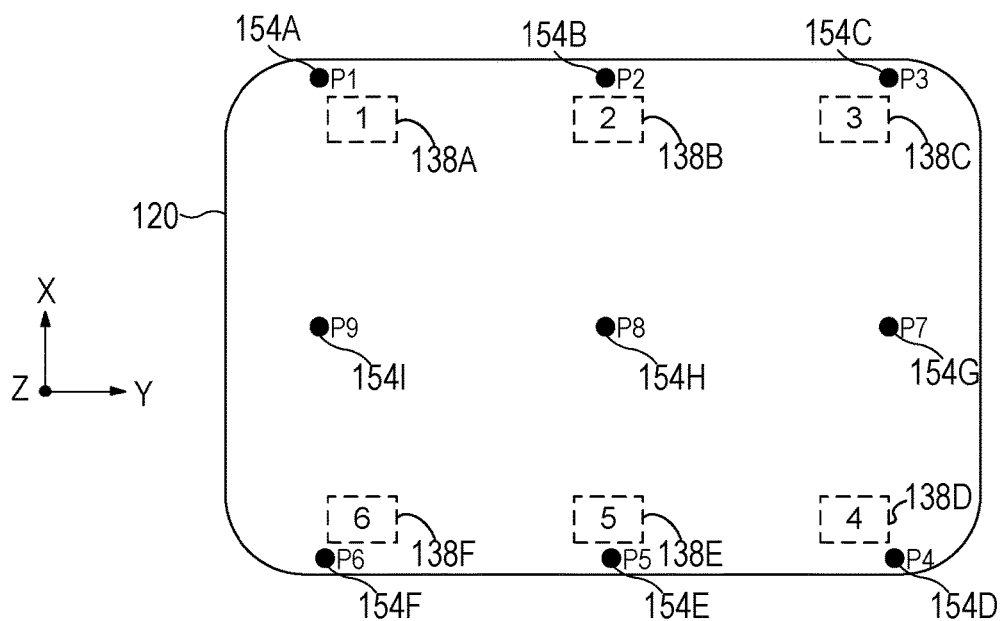
FIG. 4 shows a schematic top view of the touchpad of FIG. 1 showing force sensors and predetermined calibration positions according to examples of the present disclosure.

With reference now to FIG. 3, in one example touchpad 120 includes a touch receiving surface in the form of a cover glass layer 122 affixed to a PCB 136 by an adhesive layer (not shown). In some examples, the touch receiving surface can be fabricated from a flexible material that enhances localized force sensing across the touchpad 120. The PCB 136 includes a plurality of force sensors in the form of capacitive force sensing electrodes in the form of PCB electrodes 138 that are spaced from corresponding base plate electrodes 142 located on a base plate 146. In some examples, the PCB 136 comprises a flex circuit that includes the capacitive force sensing electrode(s). With reference to FIG. 4, in one example the touchpad 120 includes six force sensors in the form of six PCB electrodes 138A-138F and corresponding base plate electrodes. In other examples, touchpads of the present disclosure can utilize other numbers of PCB electrodes and corresponding base plate electrodes.

As schematically indicated in FIG. 3, the PCB 136 is spaced from and resiliently supported relative to the base plate 146. In this example a spring 150 resiliently supports the PCB 136 to enable movement toward and away from the base plate 146. In other examples, a variety of other configurations can be utilized to resiliently support the PCB relative to the base plate 146. For example, two or more spring elements may extend between the PCB 136 and base plate 146, and/or the PCB 136 can be affixed at one end and extend over the base plate 146. In different examples the base plate 146 functions as a ground and can comprise a conductive material such as aluminum, a non-conductive material such as plastic, or combinations of the foregoing.

In this example the PCB 136 also includes an integrated circuit 148. In some examples the integrated circuit 148 is configured to perform touch detection functionality via the touchpad 120 using a touch sensor pattern in the upper layer of the PCB 136 to sense touch on the cover glass layer 122. In other examples the integrated circuit 148 is additionally or alternatively configured to estimate a plurality of forces exerted by a plurality of contacts at a plurality of touch locations on the touchpad 120 as described further below. In other examples, PCB 136 does not include an integrated circuit, and processor 130 of computing device 100 is configured to perform touch detection and touch force determination functionality as described herein.

The following examples discuss aspects of the present disclosure in the context of the configuration of FIGS. 3 and 4. In other examples, a variety of other capacitance-based touchpad configurations can be utilized to practice the techniques of the present disclosure. For example, in some examples touchpads of the present disclosure utilize differential capacitive sensing. These touchpads include two or more linearly-aligned electrodes that are located different distances from a corresponding PCB electrode. Because the distances are different, the capacitance between each electrode and its corresponding PCB electrode is also different. This differential capacitance between the electrodes can be used to periodically recalibrate the base height do, regardless of changes in the base height from its initial value.

As noted above, in some examples a user can contact the touchpad 120 with two or more fingers, portions of a hand or limb, or other contact surfaces. For example, a user may rest one palm on the trackpad and press a finger of her other hand on the trackpad to provide input. In these examples, accurately determining the force applied by each separate contact can be challenging.

Accordingly, and as described in more detail below, configurations of the present disclosure provide touchpad configurations and related methods that can accurately estimate a plurality of forces exerted by multiple contacts at different touch locations on the touchpad. More particularly and as described further below, for each of the contacts, a plurality of assigned calibration weights are assigned to the contact from a predetermined set of calibration weights. Data from the force sensors and the plurality of assigned calibration weights are then used to determine a force exerted by the contact on the touchpad. Advantageously, these configurations allow users to simultaneously press or otherwise contact the touchpad with multiple fingers or other contact surfaces at different locations, and to accurately determine the separate, individual forces attributable to each of the contacts. As noted above, such determinations of the different forces per contact can be utilized to enhance the user experience and more closely align to user intents in a variety of use cases. The multiple determined forces can also be summed to determine a total estimated force applied to the touchpad by all of the contacts.

Figure 10:
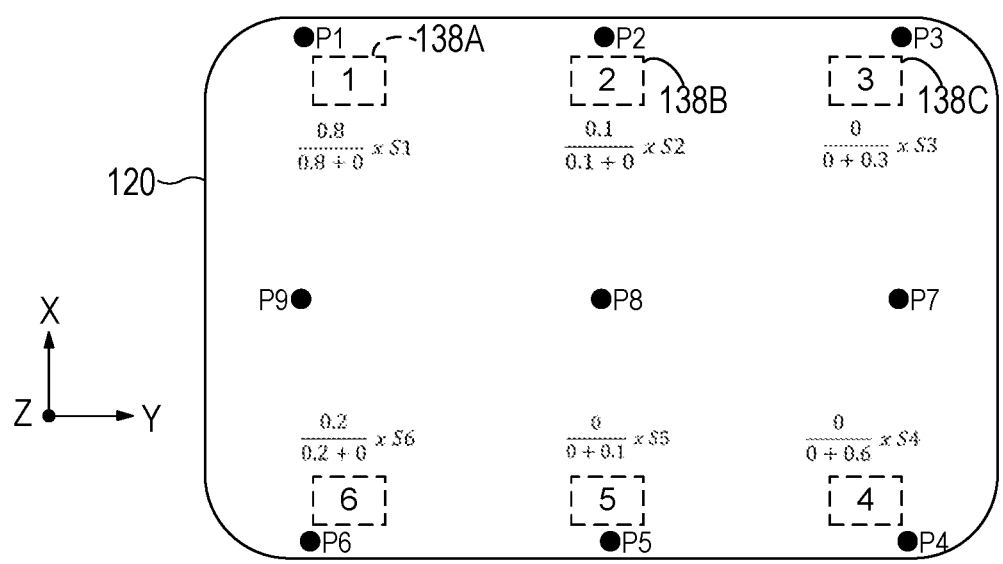
FIG. 10 shows the touchpad of FIG. 4 with example calculations of a force at each sensor that is attributable only to one contact according to an example of the present disclosure.
Figure 11A:
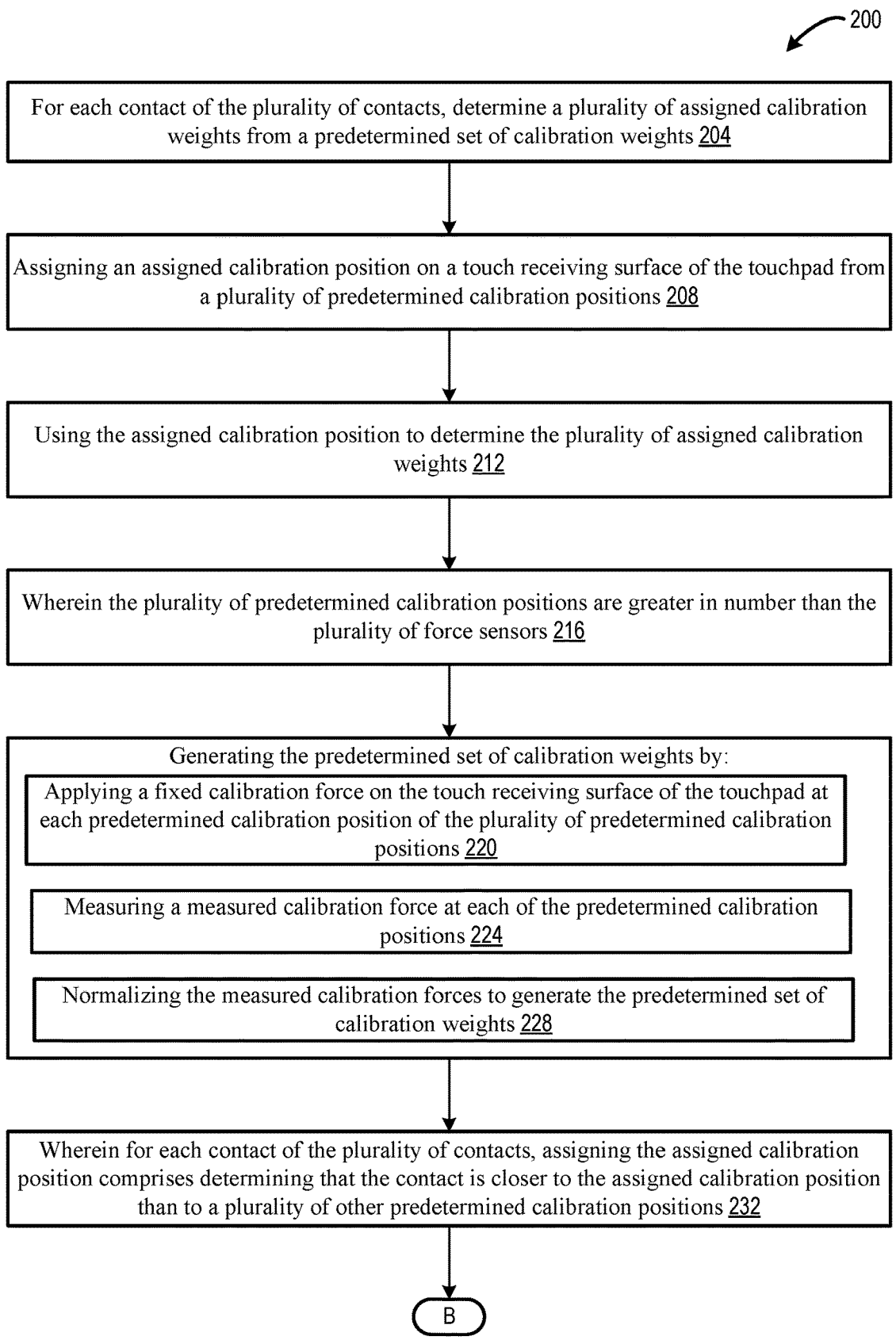

With reference now to FIG. 11A, a flow diagram is provided depicting an example method 200 for estimating a plurality of forces exerted by a plurality of contacts at a plurality of touch locations on a touchpad according to examples of the present disclosure. The following description of method 200 is provided with reference to the touchpad 120 and related components described herein and shown in FIGS. 1-10 and 12. In other examples, method 200 is performed with other configurations of touchpads and computing devices, and in other contexts using other suitable devices and components.

At 204 and as described further below, method 200 includes, for each contact of the plurality of contacts, determining a plurality of assigned calibration weights from a predetermined set of calibration weights. At 208 method 200 includes, for each contact of the plurality of contacts: assigning an assigned calibration position on a touch receiving surface of the touchpad from a plurality of predetermined calibration positions. At 212 method 200 includes, for each contact of the plurality of contacts, using the assigned calibration position to determine the plurality of assigned calibration weights for that contact.

In some examples, the predetermined set of calibration weights is generated in a calibration phase during production of the touchpad 120. In the example of FIG. 4, nine predetermined calibration positions P1-P9 are designated on the touch receiving surface (and indicated by 154A-154I). Accordingly and with reference again to FIG. 11A, at 216 method 200 includes wherein the plurality of predetermined calibration positions are greater in number than the plurality of force sensors. In one potential advantage of this configuration, using a greater number of predetermined calibration positions than force sensors can enable more precision in estimating forces applied by multiple contacts to the touchpad. In other examples, different numbers of predetermined calibration positions can be utilized, and different locations of the predetermined calibration positions on the touch receiving surface can be utilized. In other examples, the number of predetermined calibration positions is the same as the number of force sensors.

With reference again to FIG. 11A, at 220 method 200 includes generating the predetermined set of calibration weights by applying a fixed calibration force on the touch receiving surface of the touchpad at each predetermined calibration position of the plurality of predetermined calibration positions. At 224 method 200 includes measuring a measured calibration force at each of the force sensors. At 228 method 200 includes normalizing the measured calibration forces to generate the predetermined set of calibration weights.

Figure 5:
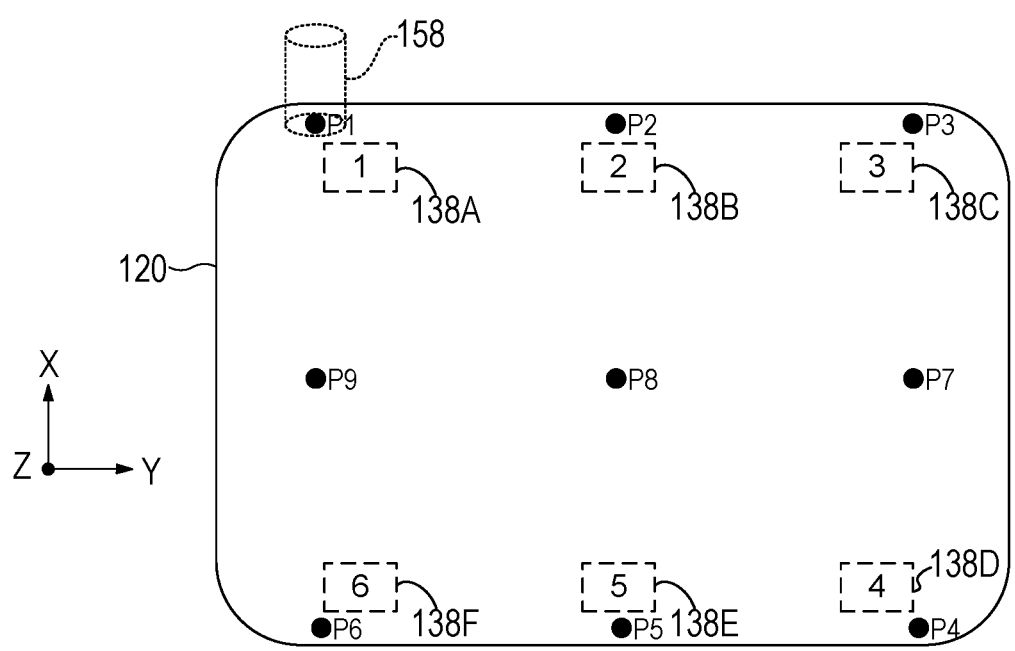
FIG. 5 shows the touchpad of FIG. 4 with a calibration weight contacting the touchpad according to examples of the present disclosure.

In the present example and with reference now to FIG. 5, a fixed calibration force 158 of 150 grams is applied to the touchpad 120 at each of the predetermined calibration positions P1-P9 on the cover glass layer 122. In other examples, other magnitudes of fixed calibration forces can be utilized. FIG. 5 schematically illustrates the application of the fixed calibration force 158 to predetermined calibration position P1 on the touchpad 120. For each application of the fixed calibration force at one of the predetermined calibration positions, the measured calibration force at each of the six force sensors is determined. FIG. 6 provides one example of a matrix of measured calibration forces that are measured using this process.

Next, the measured calibration forces are normalized to generate the predetermined set of calibration weights. In the present example, each value in the matrix of FIG. 6 is divided by 150 grams (the fixed calibration force) to generate a normalized predetermined set of calibration weights as provided in FIG. 7. In the example of FIG. 7 the numbers are rounded for ease of description. In another potential advantage of the present disclosure, by individually determining a predetermined set of calibration weights for each touchpad, as opposed to using the same fixed values for all touchpads, manufacturing tolerances, component and material differences, and other manufacturing variations between touchpads are addressed to optimize force determinations in each touchpad.

Figures 8, 9:
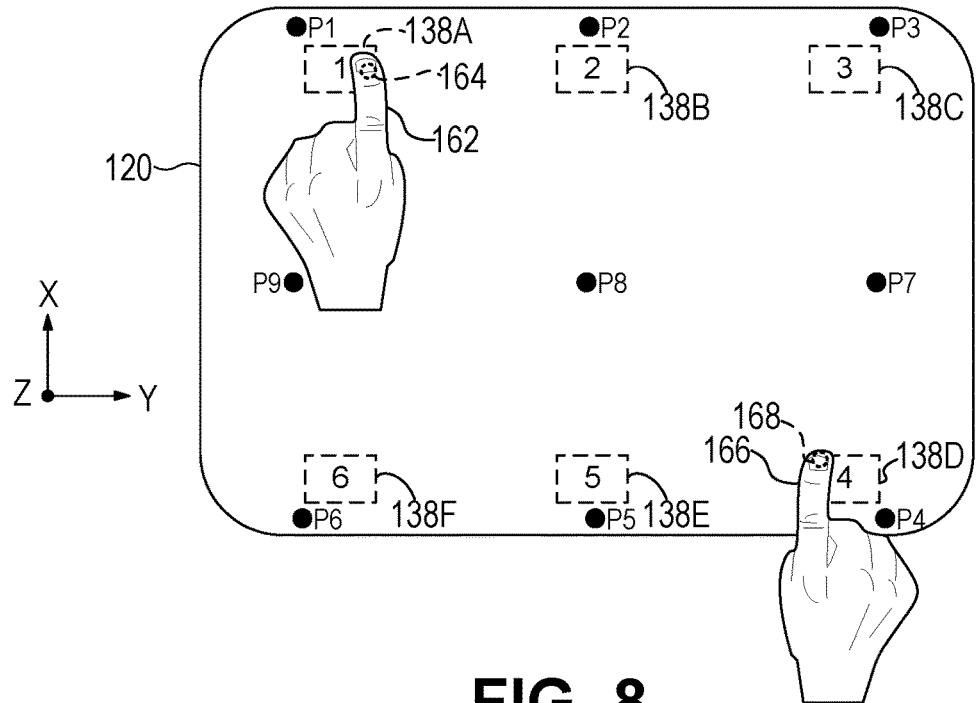
FIG. 8 shows two fingers contacting the touchpad of FIG. 4 according to an example of the present disclosure.
FIG. 9 shows the table of FIG. 7 with the normalized values corresponding to calibration positions 1 and 4 highlighted according to an example of the present disclosure.

As noted above, for each contact that is touching the touchpad, an assigned calibration position on the touch receiving surface is assigned from the plurality of predetermined calibration positions. In some examples and with reference again to FIG. 11A, at 232 method 200 includes, for each contact of the plurality of contacts, assigning the assigned calibration position comprises determining that the contact is closer to the assigned calibration position than to a plurality of other predetermined calibration positions. With reference now to FIG. 8, in one example use case a user's left index finger 162 is contacting the cover glass layer 122 at a touch location 164 in the upper left portion of the touchpad 120. The user's right index finger 166 is contacting the cover glass layer 122 at a different touch location 168 in a bottom right portion of the touchpad 120.

For the user's the left index finger 162, the touch force algorithms 134 use the (x,y) location 164 on the touch receiving surface of this finger's contact and the (x,y) locations of the predetermined calibration positions P1-P9 to determine which predetermined calibration position P1-P9 is the closest. In this example the touch force algorithms 134 determine that this contact is closer to the predetermined calibration position P1 than to any of the other predetermined calibration positions. Based at least on this determination, the predetermined calibration position P1 is assigned to the left index finger contact.

In a similar manner, for the user's the right index finger 166, the touch force algorithms 134 use the (x,y) location 168 on the touch receiving surface of this finger's contact and the (x,y) locations of the predetermined calibration positions P1-P9 to determine which predetermined calibration position P1-P9 is the closest. In this example the touch force algorithms 134 determine that this contact is closer to the predetermined calibration position P4 than to any of the other predetermined calibration positions. Based at least on this determination, the predetermined calibration position P4 is assigned to the right index finger contact at location 168.

As noted above, for each of the contacts the assigned calibration position is used to determine the plurality of assigned calibration weights for that contact. In the present example, with reference now to FIG. 9 and as described further below, because the left index finger contact is assigned to the predetermined calibration position P1, the top row associated with position P1 of normalized values from the table of FIG. 7 is used to determine the force exerted by this contact on the touchpad. Similarly, because the right index finger contact is assigned to the predetermined calibration position P4, the fourth row down associated with position P4 of normalized values from the table of FIG. 7 is used to determine the force exerted by this contact on the touchpad.

With reference now to FIG. 11B and as described further below, at 236 method 200 includes, for each contact of the plurality of contacts, using the plurality of assigned calibration weights and data from the force sensors to determine a force exerted by the contact on the touchpad. At 240 method 200 includes, for a first contact of the plurality of contacts, determining a force-per-sensor at each force sensor of the plurality of force sensors, wherein the force-per-sensor is attributable only to the first contact. At 244 method 200 includes, for the first contact of the plurality of contacts, summing the determined forces-per-sensor to determine a total force exerted by the first contact on the touchpad.

In the present example, for each of the left index finger contact at location 164 and the right index finger contact at location 168, the total force that is attributable only to each contact is determined. As noted above, the total force attributable only to a particular contact is determined by determining a force-per-sensor that is attributable only to that contact at each of the nine force sensors. In one example, the force per sensor per contact can be determined using the following formula:

$$\frac{\text{Weight Contact}_x}{\text{Weight Contact}_1 + \ldots + \text{Weight Contact}_n} \cdot \text{Input Force Per Sensor} \qquad \text{Equation 2}$$

where Weight Contact$_x$ is the assigned calibration weight for the contact under consideration (x) as selected from the set of predetermined calibration weights, and the denominator is the sum of the assigned calibration weight for the contact under consideration and the assigned calibration weight(s) for all of the other contact(s) n that are contacting the touchpad. Using this formula, the force per sensor per contact can be determined for all of the sensors of the touchpad 120. Advantageously and in this manner, the forces exerted on the touchpad by multiple contacts can be accurately estimated.

Accordingly and with reference again to FIG. 11B, at 248 method 200 comprises, wherein determining the force-per-sensor at each force sensor of the plurality of force sensors for the first contact comprises, for the first force sensor of the plurality of force sensors, dividing the assigned calibration weight that is associated with the first force sensor and the first contact by a sum of the assigned calibration weight that is associated with the first force sensor and the first contact and one or more additional assigned calibration weights associated with the first force sensor and with one or more additional contacts of the plurality of contacts.

In the present example, an example is now presented of using Equation 2 to estimate the force at each of the six sensors, where the estimated force is attributable only to the left index finger 162 contact at location 164. As noted above, because the left index finger contact is assigned to the predetermined calibration position P1, in the table of FIG. 7 the top row associated with position P1 of normalized values is used to determine the force exerted by this contact on the touchpad. In this example, there is one other contact at location 168 provided by the user's right index finger 166. Accordingly, because the right index finger contact is assigned to the predetermined calibration position P4, the fourth row down associated with position P4 of normalized values from the table of FIG. 7 is used in the denominator of Equation 2 to determine the force exerted by this contact on the touchpad.

For ease of description and with refence now to FIG. 10, a schematic depiction of the six sensors is provided along with the calculation of the force at each sensor that is attributable only to the left index finger 162, using Equation 2. For example, at sensors 1, 2, and 6, the calculation estimates that the entire force measured at each sensor (S1, S2, S6) is attributable to the left index finger 162. At sensors 3, 4, and 5, the calculation estimates that none of the force measured at each sensor (S3, S4, S5) is attributable to the left index finger 162. In some examples and as noted above, these estimated forces at each sensor are summed to yield a total estimated force exerted on the touchpad 120 that is attributable only to the left index finger 162.

The same process and calculations can be performed for estimating the force at each sensor that is attributable only to the right index finger 166. In other examples, the same process and calculations can be performed for estimating the force at each sensor that is attributable only to each contact of three or more contacts. Advantageously and in these examples, configurations of the present disclosure can individually estimate the force exerted on the touchpad 120 that is attributable only to one contact of a plurality of contacts.

In some examples, one or more additional steps can be performed using the total force estimated as described above for each contact to generate force-adjusted calibration weights for each contact that are used to calculate force-adjusted forces for each contact. In some examples and with reference again to FIG. 11B, at 252 method 200 includes, for each contact of the plurality of contacts, using the determined force exerted by the contact on the touchpad and the plurality of assigned calibration weights to generate a plurality of force-adjusted assigned calibration weights. At 256 method 200 includes using the plurality of force-adjusted assigned calibration weights and the data from the force sensors to generate a force-adjusted force exerted by the contact on the touchpad.

In some examples and for a given contact, the force-adjusted assigned calibration weight per sensor can be determined using the following formula:

$$\frac{\text{Weight Contact}_x \cdot \text{Force Contact}_x}{\text{Weight Contact}_1 \cdot \text{Force Contact}_1 + \ldots + \text{Weight Contact}_n \cdot \text{Force Contact}_n} \times \text{Input Force per Sensor}$$

Equation 3 where Weight Contact$_x$ is the assigned calibration weight for the contact under consideration (x) as selected from the set of predetermined calibration weights, Force Contact$_x$ is the total force determined for that contact as described above, and the denominator is the sum of the product of the Weight Contact$_x$ and Force Contact$_x$ for the contact under consideration and for all of the other contact(s) n. As with F Equation 2 described above, in Equation 3 the force-adjusted assigned calibration weight is multiplied by the measured force at the sensor to yield a force-adjusted force at that sensor. The force-adjusted weights of each of the six sensors are then summed to yield the force-adjusted force exerted by the contact on the touchpad.

Advantageously and in these examples, configurations of the present disclosure use the initially estimated forces per contact per sensor to generate a refined, force-adjusted force exerted by the contact on the touchpad that can reduce inaccuracies resulting from using a fixed calibration force, such as 150 grams, at each of the predetermined calibration positions P1-P9 to generate the predetermined set of calibration weights.

In other examples, other techniques for generating force-adjusted forces exerted by the contact on the touchpad can be utilized, such as other convergence techniques and inverse matrix techniques. One example of an inverse matrix technique is provided by the following equation:

$$\begin{pmatrix} F_{C1} \\ \vdots \\ F_{Cn} \end{pmatrix} = \begin{pmatrix} W_1^{pos C1} & \cdots & W_1^{pos Cn} \\ \vdots & \ddots & \vdots \\ W_6^{pos C1} & \cdots & W_6^{pos Cn} \end{pmatrix}^{-1} \begin{pmatrix} S_1 \\ \vdots \\ S_6 \end{pmatrix}$$

Equation 4 where S1-S6 are the signals from sensors 1 to 6, $W_i$ is the weight of sensor i, pos$_{Ci}$ is position of contact i, and $F_{C1}$-$F_{Cn}$ are the forces from contacts 1 to n.

In different examples and as noted above, the estimated forces exerted on the touchpad by one or more contacts can be utilized in a variety of manners to provide input to the computing device 100. For example, where the system determines that the finger force exceeds a threshold finger touch force, a click event can be reported to the computing device. In different examples the click event can be a selection of a displayed item or other user input. In some examples, when an estimated force exceeds the threshold finger touch force, the haptic feedback actuator 141 can be actuated to produce haptic feedback, such as a mechanical click.

Figure 12:
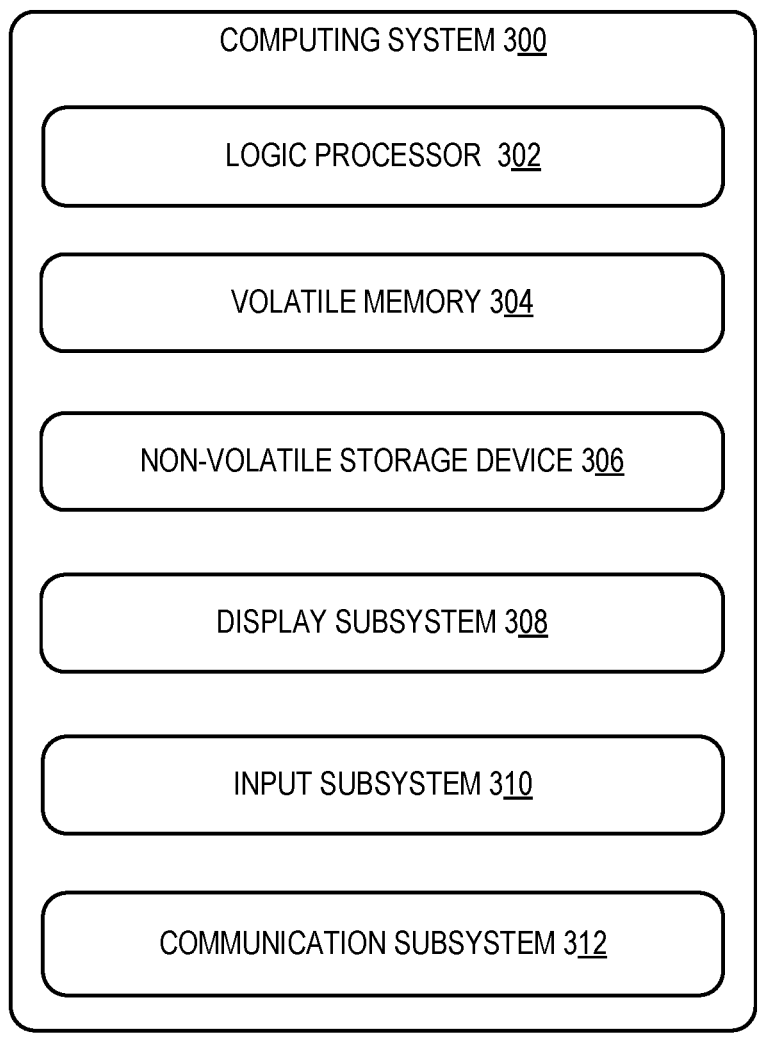
FIG. 12 shows a block diagram of an example computing system according to examples of the present disclosure.

In some embodiments, the touchpads and components described herein may be utilized with a computing system of one or more computing devices. Similarly, the methods and processes described herein may be implemented as a computer-application program or service, an application-programming interface (API), a library, and/or other computer-program product. FIG. 12 schematically shows a non-limiting embodiment of a computing system 300 configured to provide any to all of the compute functionality described herein. Computing system 300 is shown in simplified form.

Laptop computing device 100 described above may comprise computing system 300 or one or more aspects of computing system 300. Computing system 300 may take the form of one or more laptops, personal computers, server computers, tablet computers, home-entertainment computers, gaming devices, mobile computing devices, mobile communication devices (e.g., smart phone), wearable computing devices, and/or other computing devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 12.

Logic processor 302 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory (RAM). Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

Input subsystem 310 may comprise or interface with one or more user-input devices such as touchpad 120, keyboard 124, touch screen display 104, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides, at a computing device, a method for estimating a plurality of forces exerted by a plurality of contacts at a plurality of touch locations on a touchpad, the touchpad comprising a plurality of force sensors, the method comprising: for each contact of the plurality of contacts, determining a plurality of assigned calibration weights from a predetermined set of calibration weights; and for each contact of the plurality of contacts, using the plurality of assigned calibration weights and data from the force sensors to determine a force exerted by the contact on the touchpad. The method may additionally or alternatively include, for each contact of the plurality of contacts: assigning an assigned calibration position on a touch receiving surface of the touchpad from a plurality of predetermined calibration positions; and using the assigned calibration position to determine the plurality of assigned calibration weights. The method may additionally or alternatively include, wherein for each contact of the plurality of contacts, assigning the assigned calibration position comprises determining that the contact is closer to the assigned calibration position than to a plurality of other predetermined calibration positions. The method may additionally or alternatively include, wherein the plurality of predetermined calibration positions are greater in number than the plurality of force sensors. The method may additionally or alternatively include, generating the predetermined set of calibration weights by: applying a fixed calibration force on the touch receiving surface of the touchpad at each predetermined calibration position of the plurality of predetermined calibration positions; measuring a measured calibration force at each of the force sensors; and normalizing the measured calibration forces to generate the predetermined set of calibration weights. The method may additionally or alternatively include, wherein using the plurality of assigned calibration weights and the data from the force sensors to determine the force exerted by each contact of the plurality of contacts on the touchpad comprises, for a first contact of the plurality of contacts: determining a force-per-sensor at each force sensor of the plurality of force sensors, wherein the force-per-sensor is attributable only to the first contact; and summing the determined forces-per-sensor to determine a total force exerted by the first contact on the touchpad. The method may additionally or alternatively include, wherein determining the force-per-sensor at each force sensor of the plurality of force sensors for the first contact comprises, for a first force sensor of the plurality of force sensors, dividing the assigned calibration weight that is associated with the first force sensor and the first contact by a sum of the assigned calibration weight that is associated with the first force sensor and the first contact and one or more additional assigned calibration weights associated with the first force sensor and with one or more additional contacts of the plurality of contacts. The method may additionally or alternatively include, for each contact of the plurality of contacts: using the determined force exerted by the contact on the touchpad and the plurality of assigned calibration weights to generate a plurality of force-adjusted assigned calibration weights; and using the plurality of force-adjusted assigned calibration weights and the data from the force sensors to generate a force-adjusted force exerted by the contact on the touchpad. The method may additionally or alternatively include, wherein the plurality of force sensors are capacitive force sensors.

Another aspect provides force sensing touchpad, comprising: a plurality of force sensors; a processor; and a memory storing instructions executable by the processor to: for each contact of a plurality of contacts that are contacting the touchpad at a plurality of touch locations, determine a plurality of assigned calibration weights from a predetermined set of calibration weights; and for each contact of the plurality of contacts, use the plurality of assigned calibration weights and data from the force sensors to determine a force exerted by the contact on the touchpad. The force sensing touchpad may additionally or alternatively include, wherein the instructions are executable to, for each contact of the plurality of contacts: assign an assigned calibration position on a touch receiving surface of the touchpad from a plurality of predetermined calibration positions; and use the assigned calibration position to determine the plurality of assigned calibration weights. The force sensing touchpad may additionally or alternatively include, wherein for each contact of the plurality of contacts, assigning the assigned calibration position comprises determining that the contact is closer to the assigned calibration position than to a plurality of other predetermined calibration positions. The force sensing touchpad may additionally or alternatively include, wherein the plurality of predetermined calibration positions are greater in number than the plurality of force sensors. The force sensing touchpad may additionally or alternatively include, wherein the instructions are executable to generate the predetermined set of calibration weights by: applying a fixed calibration force on the touch receiving surface of the touchpad at each predetermined calibration position of the plurality of predetermined calibration positions; measuring a measured calibration force at each of the force sensors; and normalizing the measured calibration forces to generate the predetermined set of calibration weights. The force sensing touchpad may additionally or alternatively include, wherein using the plurality of assigned calibration weights and the data from the force sensors to determine the force exerted by each contact of the plurality of contacts on the touchpad comprises, for a first contact of the plurality of contacts: determining a force-per-sensor at each force sensor of the plurality of force sensors, wherein the force-per-sensor is attributable only to the first contact; and summing the determined forces-per-sensor to determine a total force exerted by the first contact on the touchpad. The force sensing touchpad may additionally or alternatively include, wherein determining the force-per-sensor at each force sensor of the plurality of force sensors for the first contact comprises, for a first force sensor of the plurality of force sensors, dividing the assigned calibration weight that is associated with the first force sensor and the first contact by a sum of the assigned calibration weight that is associated with the first force sensor and the first contact and one or more additional assigned calibration weight associated with the first force sensor and with one or more additional contacts of the plurality of contacts. The force sensing touchpad may additionally or alternatively include, wherein the instructions are executable to, for each contact of the plurality of contacts: use the determined force exerted by the contact on the touchpad and the plurality of assigned calibration weights to generate a plurality of force-adjusted assigned calibration weights; and using the plurality of force-adjusted assigned calibration weights and the data from the force sensors to generate a force-adjusted force exerted by the contact on the touchpad. The force sensing touchpad may additionally or alternatively include, wherein the plurality of force sensors are capacitive force sensors.

Another aspect provides computing device, comprising: a force sensing touchpad, comprising: a plurality of force sensors; a processor; and a memory storing instructions executable by the processor to: for each contact of a plurality of contacts that are the touchpad contacting at a plurality of touch locations, determine a plurality of assigned calibration weights from a predetermined set of calibration weights; and for each contact of the plurality of contacts, use the plurality of assigned calibration weights and data from the force sensors to determine a force exerted by the contact on the touchpad. The force sensing touchpad may additionally or alternatively include, wherein the instructions are executable to, for each contact of the plurality of contacts: assign an assigned calibration position on a touch receiving surface of the touchpad from a plurality of predetermined calibration positions; and use the assigned calibration position to determine the plurality of assigned calibration weights.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for estimating a plurality of forces exerted by a plurality of contacts at a plurality of touch locations on a touchpad, the touchpad comprising a plurality of force sensors, the method comprising, for each contact of the plurality of contacts:
   assigning an assigned calibration position on a touch receiving surface of the touchpad from a plurality of predetermined calibration positions;
   using the assigned calibration position, determining a plurality of assigned calibration weights from a predetermined set of calibration weights; and
   using the plurality of assigned calibration weights and data from the force sensors to determine a force exerted by the contact on the touchpad.

2. The method of claim 1, wherein for each contact of the plurality of contacts, assigning the assigned calibration position comprises determining that the contact is closer to the assigned calibration position than to a plurality of other predetermined calibration positions.

3. The method of claim 1, wherein the plurality of predetermined calibration positions are greater in number than the plurality of force sensors.

4. The method of claim 1, further comprising generating the predetermined set of calibration weights by:
 applying a fixed calibration force on the touch receiving surface of the touchpad at each predetermined calibration position of the plurality of predetermined calibration positions;
 measuring a measured calibration force at each of the force sensors; and
 normalizing the measured calibration forces to generate the predetermined set of calibration weights.

5. The method of claim 1, wherein using the plurality of assigned calibration weights and the data from the force sensors to determine the force exerted by each contact of the plurality of contacts on the touchpad comprises, for a first contact of the plurality of contacts:
 determining a force-per-sensor at each force sensor of the plurality of force sensors, wherein the force-per-sensor is attributable only to the first contact; and
 summing the determined forces-per-sensor to determine a total force exerted by the first contact on the touchpad.

6. The method of claim 5, wherein determining the force-per-sensor at each force sensor of the plurality of force sensors for the first contact comprises, for a first force sensor of the plurality of force sensors, dividing the assigned calibration weight that is associated with the first force sensor and the first contact by a sum of the assigned calibration weight that is associated with the first force sensor and the first contact and one or more additional assigned calibration weights associated with the first force sensor and with one or more additional contacts of the plurality of contacts.

7. The method of claim 1, further comprising, for each contact of the plurality of contacts:
 using the determined force exerted by the contact on the touchpad and the plurality of assigned calibration weights to generate a plurality of force-adjusted assigned calibration weights; and
 using the plurality of force-adjusted assigned calibration weights and the data from the force sensors to generate a force-adjusted force exerted by the contact on the touchpad.

8. The method of claim 1, wherein the plurality of force sensors are capacitive force sensors.

9. A force sensing touchpad, comprising:
 a plurality of force sensors;
 a processor; and
 a memory storing instructions executable by the processor to:
  for each contact of a plurality of contacts that are contacting the touchpad at a plurality of touch locations, assigning an assigned calibration position on a touch receiving surface of the touchpad from a plurality of predetermined calibration positions;
  for each contact of the plurality of contacts, using the assigned calibration position to determine a plurality of assigned calibration weights from a predetermined set of calibration weights; and
  for each contact of the plurality of contacts, use the plurality of assigned calibration weights and data from the force sensors to determine a force exerted by the contact on the touchpad.

10. The force sensing touchpad of claim 9, wherein for each contact of the plurality of contacts, assigning the assigned calibration position comprises determining that the contact is closer to the assigned calibration position than to a plurality of other predetermined calibration positions.

11. The force sensing touchpad of claim 9, wherein the plurality of predetermined calibration positions are greater in number than the plurality of force sensors.

12. The force sensing touchpad of claim 9, wherein the instructions are executable to generate the predetermined set of calibration weights by:
 applying a fixed calibration force on the touch receiving surface of the touchpad at each predetermined calibration position of the plurality of predetermined calibration positions;
 measuring a measured calibration force at each of the force sensors; and
 normalizing the measured calibration forces to generate the predetermined set of calibration weights.

13. The force sensing touchpad of claim 9, wherein using the plurality of assigned calibration weights and the data from the force sensors to determine the force exerted by each contact of the plurality of contacts on the touchpad comprises, for a first contact of the plurality of contacts:
 determining a force-per-sensor at each force sensor of the plurality of force sensors, wherein the force-per-sensor is attributable only to the first contact; and
 summing the determined forces-per-sensor to determine a total force exerted by the first contact on the touchpad.

14. The force sensing touchpad of claim 13, wherein determining the force-per-sensor at each force sensor of the plurality of force sensors for the first contact comprises, for a first force sensor of the plurality of force sensors, dividing the assigned calibration weight that is associated with the first force sensor and the first contact by a sum of the assigned calibration weight that is associated with the first force sensor and the first contact and one or more additional assigned calibration weight associated with the first force sensor and with one or more additional contacts of the plurality of contacts.

15. The force sensing touchpad of claim 9, wherein the instructions are executable to, for each contact of the plurality of contacts:
 use the determined force exerted by the contact on the touchpad and the plurality of assigned calibration weights to generate a plurality of force-adjusted assigned calibration weights; and
 using the plurality of force-adjusted assigned calibration weights and the data from the force sensors to generate a force-adjusted force exerted by the contact on the touchpad.

16. The force sensing touchpad of claim 9, wherein the plurality of force sensors are capacitive force sensors.

17. A computing device, comprising:
 a force sensing touchpad, comprising:
  a plurality of force sensors;
  a processor; and
  a memory storing instructions executable by the processor to:
   for each contact of a plurality of contacts that are contacting the touchpad at a plurality of touch locations, assign an assigned calibration position on a touch receiving surface of the touchpad from a plurality of predetermined calibration positions;
   for each contact of the plurality of contacts, using the assigned calibration position to determine a plurality of assigned calibration weights from a predetermined set of calibration weights; and
   for each contact of the plurality of contacts, use the plurality of assigned calibration weights and data from the force sensors to determine a force exerted by the contact on the touchpad.

* * * * *